Sept. 17, 1957 H. M. VERNON ET AL 2,806,253
METHOD AND APPARATUS FOR THE PRODUCTION OF PROSTHESES
SUCH AS DENTURES
Filed Oct. 19, 1953 4 Sheets-Sheet 4
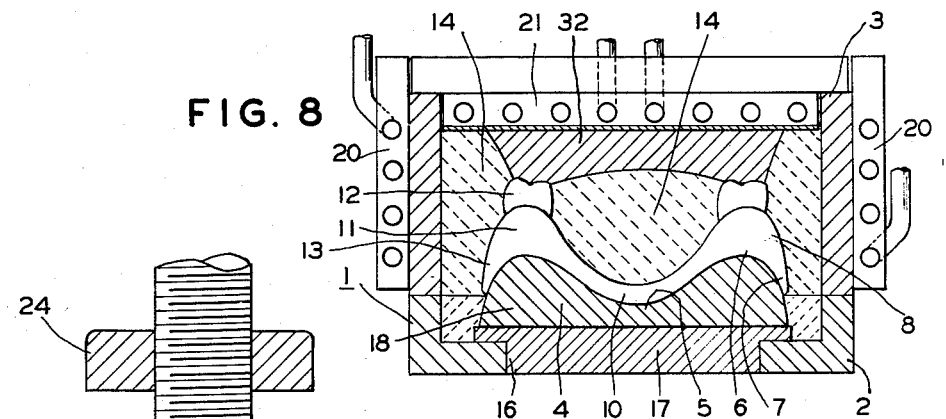
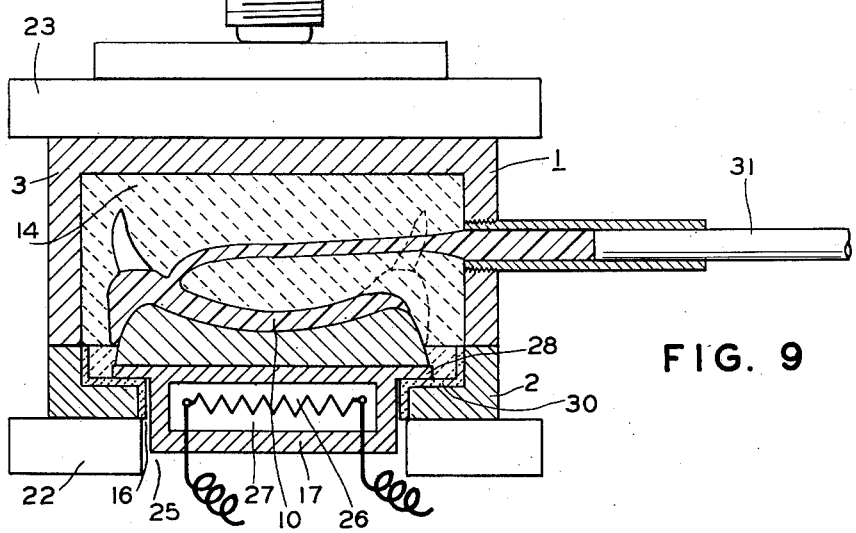
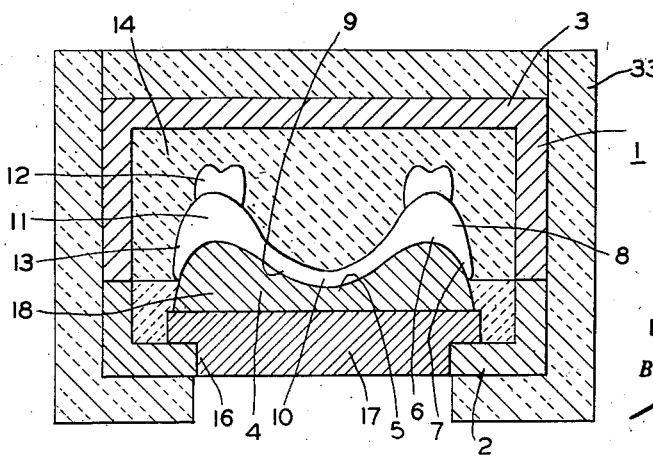
INVENTORS
HAROLD M. VERNON AND
LESTER B. VERNON
BY
THEIR ATTORNEY

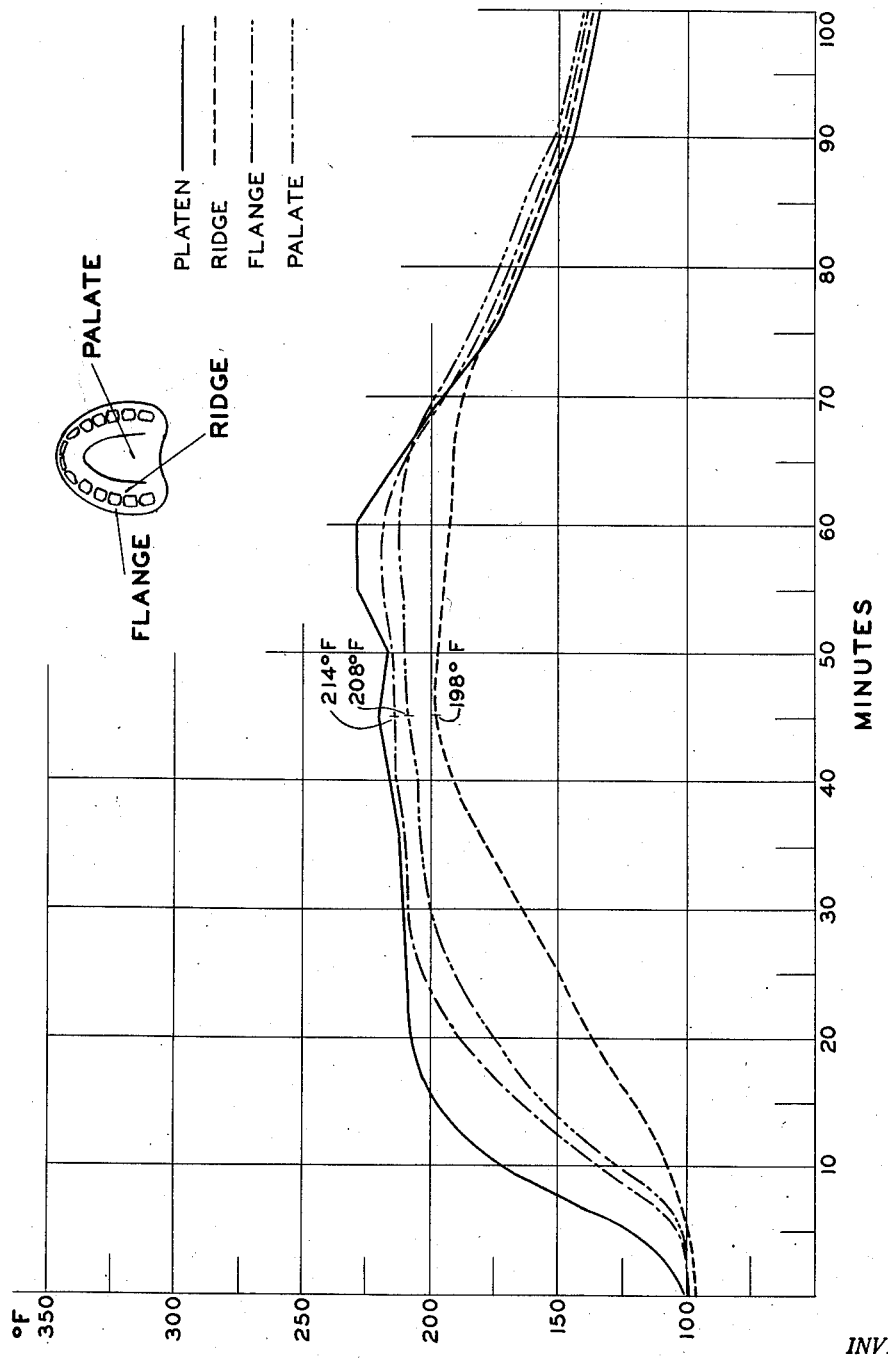

United States Patent Office 2,806,253
Patented Sept. 17, 1957

2,806,253

METHOD AND APPARATUS FOR THE PRODUCTION OF PROSTHESES SUCH AS DENTURES

Harold M. Vernon, Thornburg, and Lester B. Vernon, Beaver, Pa.

Application October 19, 1953, Serial No. 386,831

18 Claims. (Cl. 18—33)

This invention relates generally to the molding and polymerization of restorations such as full and partial dentures and other prostheses made of polymerizable monomer-polymer mixtures, more particularly to prostheses having tissue bearing surfaces which require accurate adaptation to the body part against which they fit and which supports them.

There are many types of prostheses molded from polymerizable resins but the most common are the dentures which are used as examples in describing this invention.

In molding a denture or similar device it is the common practice to heat the whole of the mold to allow the heat to enter from all directions simultaneously to polymerize the device. If the denture or other device has thick sections, such as the ridge supporting the teeth on a denture, the exothermic heat of polymerization of the resin accumulates causing inaccuracies in the thinner sections such as the palate which must accurately fit the vault of the mouth.

The principal object of this invention is the provision of a method and apparatus for applying heat unidirectionally into the mold to polymerize the denture or other device unidirectionally and thus control the accuracy of the surfaces initially polymerized.

Other objects and advantages appear hereinafter in the following description and claims.

The accompanying drawings show for the purpose of exemplification, without limiting the invention or claims thereto, certain practical embodiments illustrating the principles of the invention wherein:

Fig. 4 is a graph showing the time-temperature curves of different points of an upper denture during polymerization under our new process.

Fig. 8 is a view in vertical section of a flask containing an invested upper denture on a cast extending through the floor of the drag and the cope having cooling means.

Fig. 9 is a view in vertical section of a flask containing an invested denture and cast supported between platens.

Fig. 10 is a view in vertical section of an externally insulated flask containing an invested denture mounted on a cast seated on a plug.

Figure 1:
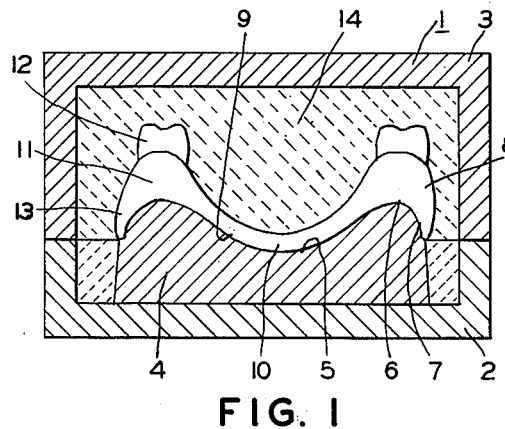
Fig. 1 is a view in vertical section of a flask containing an invested upper denture on a cast.

In describing our invention we employ the terms commonly used in the present art of processing artificial dentures and the like. Fig. 1 illustrates a typical upper denture invested in a flask according to usual method of processing now in use.

In the structure of each of the Figs. 1, 2, and 5 to 10, the flask 1 is essentially a metal box made of separable parts, the drag 2 and the cope 3, which fit accurately together. The number of parts and the manner in which they fit together and come apart are for convenience of filling the flask and recovering the finished denture after processing and are quite old in the art and are not to be explained here in complete detail. Flasks vary somewhat in design and the figures shown are for illustration only and do not necessarily represent the precise design of any flask. Some flasks have means to lock the drag to the cope and others are merely placed in a clamp.

The cast 4 is sometimes referred to also as the model. It is made of a gypsum material, sometimes plaster of Paris, but more commonly a harder gypsum product known in the art as an artificial stone. It is made by pouring the freshly mixed stone against the impression of the body part which is to be supplied with a prosthesis. Thus the cast reproduces the body part to be fitted, having the latter's shape and contours so that in the molding operation it serves as a surrogate for the body part. In the illustration, the cast 4 represents a cross section of the upper edentulous jaw of a person's mouth, 5 being the vault or palate, 6 being the ridges, 7 being the buccal surfaces. Since the whole area of the cast 4 is a true reproduction of the body part to which the prosthesis is to be fitted, it is very important that the molding and processing of the prosthesis be such as to gain the closest and most accurate adaptation of the prosthesis to this area of the cast.

The prosthesis 8 in this cast is a full upper denture. Its sections are the same as the corresponding sections previously referred to, viz., the vault or palate 10, the ridge 11 retaining the teeth 12, and the buccal section or flanges, 13.

That surface of the prosthesis 8 which lies against the cast is the tissue bearing surface 9, for it is the surface which will lie against living tissue when the prosthesis is in the service for which it is intended.

14 is the investment. Usually it is plaster of Paris, sometimes artificial stone. Its purpose is to retain the assemblage above described denture firmly in place and to serve as one surface of the mold matrix and as a conductor of heat when the prosthesis 8 is molded and polymerized under the present practice.

From the foregoing it will be clear that the making of a prosthesis begins with a cast 4. A waxed prosthesis is first formed upon the cast 4. The waxed cast is then invested in the bottom of the drag 2 of the flask 1. The whole wax assemblage is then invested in the cope 3 of the flask, and finally, the flask is separated, the wax removed, and resinous material supplied to the matrix. The details of these steps are omitted from this description because they are not pertinent to our invention, the principles of which apply to those stages of the technique after the matrix or cavity of the mold is filled with a polymerizable monomer-polymer mixture and the mold is closed under proper compression. It is customary in the present art to heat the whole of the flask to a high enough temperature and for a long enough period of time, and to allow the heat to penetrate from all sides of the flask simultaneously to polymerize the resinous material in the matrix of the mold to its desired form. The flask is then cooled and opened, the prosthesis recovered, trimmed and polished and made ready for service.

There are various media in which the flask is heated. The most common is a water bath into which the flask is immersed, but in some instances, the flask is placed in a steam autoclave or in a tank containing water vapor. In other instances the flask is placed in an oven, and in still other cases it is placed between heated upper and lower platens of an electric press which first heats the whole of the flask before the heat penetrates the investment.

Just as there are various means of heating the flask, there are various time-temperature cycles for the processing operation, these depending upon the type of heat medium, the size and nature of the prosthesis, and the judgment of the operator. A very common practice is to heat the flask at a constant temperature 160° F. for from five to nine hours.

Whatever the medium of heat, and whatever time-temperature cycle is employed, it is the usual practice to subject the whole of the flask to the same degree of elevated temperature, so that the same degree of heat enters the flask from every direction simultaneously. Flasks are generally so designed that the normal cast will locate the prosthesis at their approximate center, and heat media are generally constructed on the principle universally accepted that the same degree of heat is impinged on every wall of the mold matrix at as nearly as possible the same time, in an attempt to set up a uniform and even polymerization of the resin throughout its mass.

This method of polymerizing the prosthesis has inherent disadvantages both as regards the adaptation of the prosthesis to the cast and as regards the physical properties of the polymer produced. For instance, by inserting thermocouples in various areas of the plastic resin, we discovered the following to be the usual course of polymerization, using the illustration in Fig. 1 as a typical example. The first section to receive heat is the buccal-labial flange 13, this being nearest to the source of heat, and the first section to polymerize. The next section to polymerize is the ridge 11, which because of the exothermic properties of the resin and due to its greater thickness, hence bulk of resin, the heat generated quickly raises section 11 to a temperature above the ambient temperature of the bath and investment. The last section to receive heat and to polymerize is the palate area 10.

It is well known that a polymerizing resin evolves exothermic heat of reaction, and if the resin is confined in a relatively poor heat conductor, there is a build-up of temperature, the extent of the temperature rise depends on the bulk of resin present, and the greater the bulk the higher the temperature as this action is accumulative. As shown there are very thin sections and quire thick sections in the same prosthesis 8. Since the temperature build-up is greater in the thick sections than in the thin sections, it will be seen that there are marked differences in the temperature build-up in various sections of the prosthesis. For example, in such an upper denture as illustrated in Fig. 1, while the ambient temperature is 160° F., the peak polymerizing temperature of the labial-buccal flange 13 will be of the order of 175° F., that of the palate 10 of the order of 187° F., that of the ridge 11 of the order of 221° F. If the ambient temperature were higher than 160° F., the difference in peak temperatures in various sections of the molding would be even greater.

Thus it will be seen that the prior practice of admitting the same degree of heat to the mold from all directions simultaneously so as to polymerize all surfaces simultaneously, produces a very undesirable effect due to this build up of temperature. Instead of setting up an even and uniform polymerization, the present method has some sections of the prosthesis polymerizing ahead of other sections, and it has the various sections polymerizing at different temperature levels. This results in two kinds of harm to the prosthesis, one having to do with the fit or adaptation of the prosthesis, the other having to do with the character of polymer formed.

For example, in the case of an upper denture as illustrated in Fig. 1, when the buccal flanges 13 polymerize before every other area, the resin in the palate 10 being still unpolymerized and soft, a pull is created across the palate lifting the material from the surface of the cast 4 which creates a slight space at the vault between the prosthesis and the cast, and it polymerizes under these strained conditions resulting in an inferior fit of the restoration. This is a common difficulty, but there are often other evidences of distortions set up by unequal internal stresses due to this sequence of polymerization in the various sections of the prosthesis at different rates and at different temperatures.

An example of the harm arising from different peaks of polymerization temperature within a single prosthesis is present in an upper denture. It invariably happens that the ridge section 11 which is the thickest section, attains the highest temperature of polymerization and forms polymer of the greatest strength where strength is the least needed, whereas the palate section 10 attains a lower order of polymerization temperature and forms a weaker polymer where polymer of maximum strength is needed and could be had only by higher temperature polymerization. If the operation is carried on with higher ambient temperature in order to polymerize the palate at a higher temperature there is a runaway polymerization due to the exothermic heat in the ridges, reaching such a high peak of temperature that the resin boils and the ridges are left full of bubbles.

To minimize these difficulties it is necessary that the operator exercise the greatest skill in packing the resin into his flask and to process the denture at a constant carefully regulated ambient temperature of the order of 160° F. and for a period of the order of nine hours.

Figure 2:
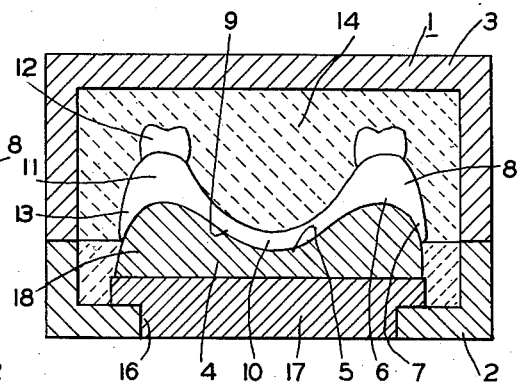
Fig. 2 is a view in vertical section of a flask containing an invested upper denture and having a heat conductor plug below the cast.

To eliminate all these difficulties and produce an improved prosthesis in a great reduction of time, and eliminate the skill and the pains now required of the operator, we have invented a new method of polymerizing the prosthesis which is a direct reverse of the present method in that instead of admitting heat to the mold cavity from all directions simultaneously, we admit heat at only one place and at the same time blocking off the entrance of heat to the flask at every other place as illustrated in Fig. 2. Specifically, our purpose is to heat the cast only, which is relatively thin as compared to the cast shown in Fig. 1, and to radiate heat through the thin cast to insure that the cast side only of the mold cavity is heated, so that polymerization of the resin will be initiated over only the cast area of the prosthesis, or so that the tissue bearing surface of the prosthesis will be polymerized and fixed, first, polymerization proceeding thereafter in the direction away from the cast which we define to be unidirectional polymerization.

We have found that by directing heat into the cast, preferably from the cast's base through the metal plug 17 in the opening 16, or the surface opposite the surface which represents tissue, and by preventing the entrance of heat to all other areas of the flask, a layer of polymer is laid down in the matrix against every area of the cast at practically the same time and at substantially the same temperature. This layer conforms closely to the contours of the surface of the cast, and the polymer formed thereafter, builds up in the direction away from the cast in a layer-upon-layer fashion consistent with sound polymerization principles. The effect is to produce a uniform polymer of maximum strength in every section of the prosthesis and also produce a close adaptation of the polymer to the cast than is obtained in the practical operations of the present art.

This method comprising our invention does in one hour what requires nine hours under the present practice. We have molded two similar dentures to illustrate how a prosthesis can be successfully processed by our invention in a shorter period of time than by the common method now in use, and also to show how by our invention, various sections of the prosthesis are polymerized at closer to the same temperature levels than is the case where heat enters the flask from all directions. Two graphs are presented which show the course of polymerization in the two instances by means of the exothermic reaction in various sections of the dentures during the processing period.

In each case the same upper denture was polymerized, that is to say, duplicate casts and duplicate wax patterns were used, making the dentures identical in size, shape, and distribution of bulk. Also the same monomer-polymer mixture was used in the two dentures. The ambient temperature gradients were as nearly the same in the two processing operations as it was possible to make them. A temperature rise from 100° F. to 210° F. and to 220° F. respectively in forty-five minutes was employed. In both cases thermocouples were placed in the resin in the same spot in the buccal flange, in the palate and in the ridge of each denture as indicated on the drawing, the thermocouples being connected to a recording potentiometer. In these graphs degrees Fahrenheit are given on the abscissa and minutes on the ordinate. The curves show the ambient temperatures and resin temperatures in various areas of the two dentures during polymerization and thereafter for a total period of one hundred minutes.

Figure 3:
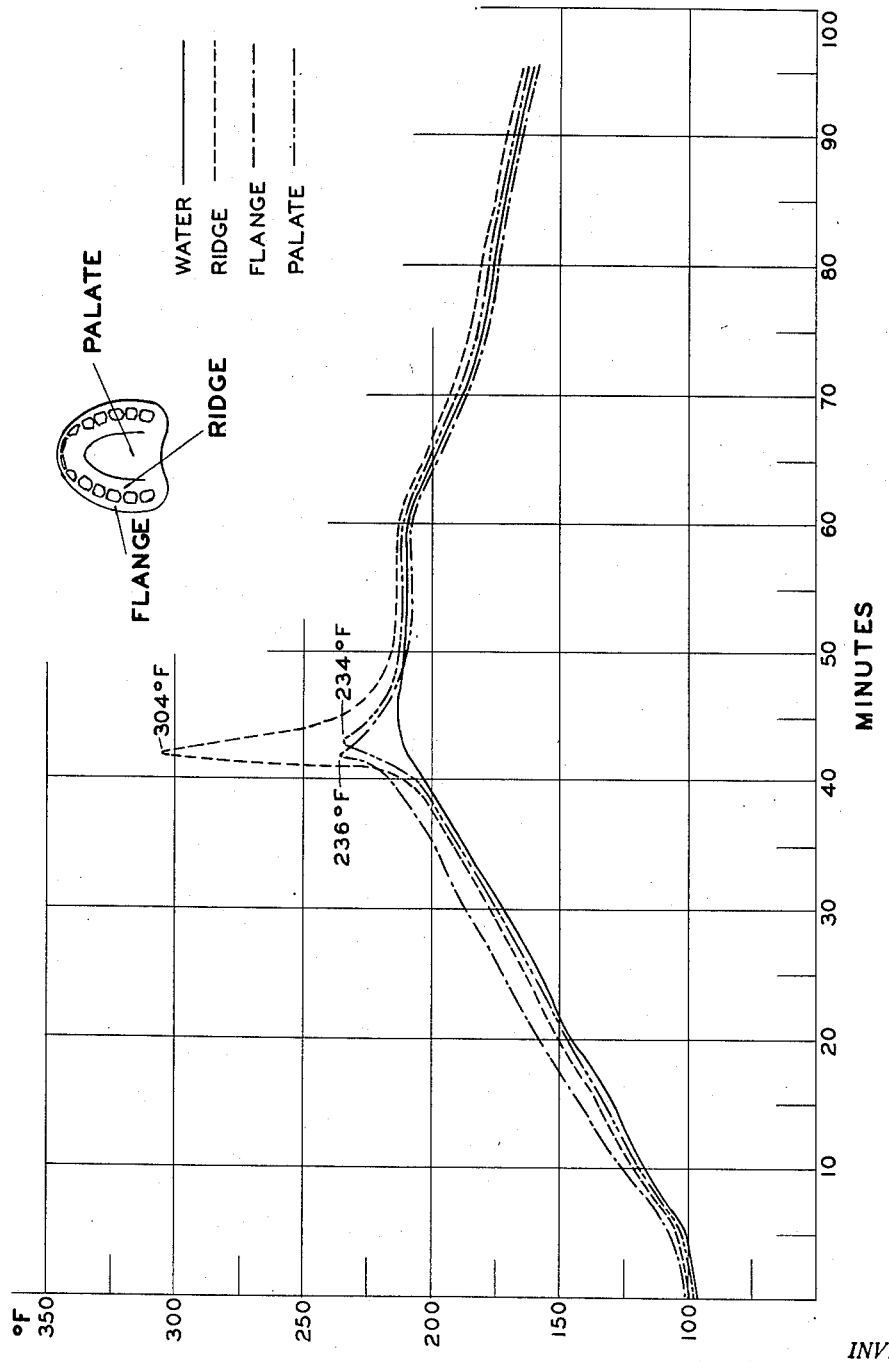
Fig. 3 is a graph showing the time-temperature curves at different points of an upper denture during polymerization under the present process.

The curves in Fig. 3 show the polymerization reaction of the denture processed in the usual way. An ordinary flask containing the invested cast and resin was suspended in a tank of heated water which is the commonly accepted practice. Curves show the rise of ambient temperature of the water and of the resin in the various sections of the denture. As will be seen, in the interval between forty and forty-five minutes after starting, there were three distinct polymerization peaks, the temperature in the flange being 236° F., that in palate 234° F., that in the ridge 304° F. These peaks were reached while ambient water temperature rose from 208° F. to 210° F. Thus there was a difference of 70° between the lowest temperature in the palate of 234° F. and the highest in the ridge of 304° F. Anyone familiar with the art will understand that this was not a feasible processing technique because the heat rise was too rapid. This proved by the poor character of denture which was recovered. The polymerized denture did not fit the cast satisfactorily and the ridges were full of bubbles.

The curves of Fig. 4 show polymerization of the denture processed in the same time interval in accordance with our invention, the resin having been invested in the type of flask referred to hereafter as in Fig. 2. Heat was conducted into the cast 4 in the drag 2 of the flask by means of an electrically heated platen on a press which held the flask. The opposite platen against the cope of the flask being cold, the whole of the metal flask did not heat up. As the curves show in Fig. 4 there are not sharp peaks of temperature as found in the curves of Fig. 3 illustrating that polymerization took place at a more even and uniform rate. In the five minute interval between forty and forty-five minutes after the start of processing, the flange was at 214° F., the palate at 208° F. while the ridge was at 198° F., showing that in this case the usual course of polymerization was reversed, the tissue bearing area was first polymerized, the ridge and buccal sections following later. The ambient temperature of the hot platen was 220° F. The difference between the highest and lowest resin temperature was 16 degrees. The denture in this case had more precise adaptation to the cast than it is customary to find in such work and was in every respect a sound and satisfactory denture.

To accomplish the purpose of our invention we have constructed several devices, a number of which will be described as examples, it being understod that many variations of these may be employed to accomplish the purpose of our invention, which is to conduct heat unidirectionally into the flask at one point while keeping all other areas of the flask at a lower temperature, so that the tissue bearing surface of the prosthesis will be initially polymerized.

Figure 5:
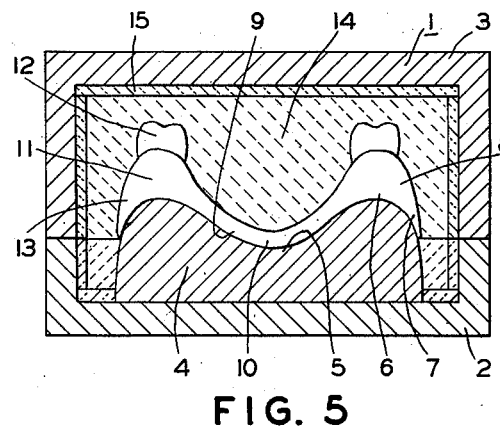
Fig. 5 is a view in vertical section of a flask in which the investment is insulated on all sides except for an area on the floor of the drag.

Referring to Fig. 5 the flask 1 is insulated as indicated at 15 on all sides except for an area on the floor of the lower section or drag of the approximate size and shape of the cast's base.

Figure 6:
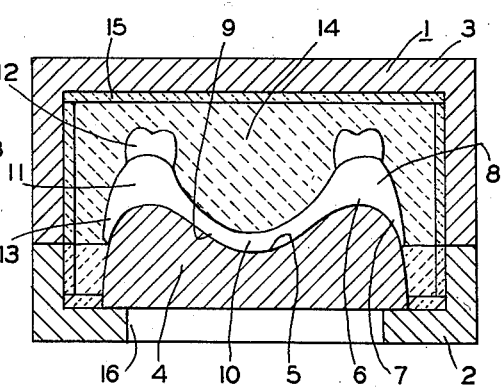
Fig. 6 is a view in vertical section of a flask containing an invested upper denture on a cast the bottom of which is exposed through an opening in the floor of the drag.

Referring to Fig. 6 the metal flask 1 as shown is provided with the hole 16 in the floor of the drag to expose the base of the case, all other surfaces of the flask being insulated as indicated at 15.

Figure 7:
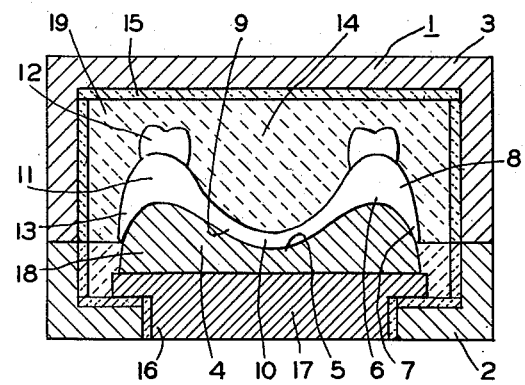
Fig. 7 is a view in vertical section of a flask containing an invested upper denture on a cast supported on a plug.

Referring to Fig. 7 the flask 1 with the hole 16 in the floor of the drag 2 is closed with a metal plug 17 which is fitted therein. Said plug being thicker than the floor of said drag to serve as the base for the thin cast 4 and as a heat conductor, the whole of the investment is insulated from the flask as indicated at 15. The artificial stone used to make the thin cast 18 contains a powdered metal such as aluminum powder to make it more heat conductive, and the plaster used for investment 19 containing an insulating powder such as silocel to lower its heat conductivity. The cast is heated by placing the flask on a heated surface such as a hot plate or a platen or by immersing the same in a bath. Powdered metal may be used in the casts 4 of the structures shown in the other figures as indicated at 18.

A flask providing for the easy entry of heat into the bottom of the drag is shown in Fig. 8 wherein the cope 3 is provided with water jackets 20 and 21 to cool the sides and top of the cope 3 while admitting heat only into the bottom of the drag 2. Cold water is circulated through these water cooled jackets 20 and 21 to draw any heat away from the drag to insure unidirectional polymerization. A portion 32 of the investment has included therein powdered metal to conduct heat from the teeth to the water jacket 20.

As shown in Fig. 9 the flask 1 is provided with an opening 16 in the floor of the drag over which is mounted a removable recessed metal plate or plug 17 serving as a heat conductor. The cast rests on the heat conductor. When the flask is assembled, it is placed between cold metal platens 22 and 23 which are closed by the clamp 24 to hold the flask firmly in place. Into the opening 25 in one of the platens, is inserted an electric coil heater 26 of such size and shape to pass through the openings 25 and 16 in the platen 22 in the drag 2 of the flask 1 and fit approximately into the cavity 27 of the heat conductor 28. Heat from the electric coil 26 passes through the heat conductor plug 28 directly into the cast and is prevented from entry into the investment at the base of the cast by the insulation 30 around the side walls of the drag to insulate heat conductor plug 28 from the floor and the inner walls of the flask. After the initial polymerization of the palate 10 of the prosthesis, heat flows through the prosthesis into the investment and thence to the metal cast 1 and the platen 23 on the cope side of the flask which absorbs heat from the flask thus maintaining the unidirectional flow of heat through the cast and the flask to provide unidirectional polymerization.

In order to further speed up the polymerization reaction by conducting it at a higher temperature level than usual, we may attach a pressure device to the flask, known in the art as an injector gun shown at 31 in Fig. 9, which feeds soft, unpolymerized resin into the mold and maintains a positive or hydrostatic pressure on the polymerizing resin. The increase of pressure within the mold during polymerization along with a temperature of the order of 350° F. will enable the prosthesis to be fully polymerized in from twenty to thirty minutes as opposed to an hour by our invention without the injection gun.

In Fig. 10 the whole of the flask 1 is covered with insulation as indicated at 33. The flask 1, usually of metal, is enclosed and only the bottom face of the plug 17 is exposed. This insulation jacket 33 keeps the heat out of the flask allowing it to enter only through the plug 17 in the bottom of the drag. The heat thus entering unidirectionally is conducted by the cast to the tissue bearing surface 9 of the prosthesis. Thus the palate 10 of the denture is polymerized first and polymerization is progressive unidirectionally from this tissue bearing surface. The whole of the insulated flask may be immersed in a hot liquid bath as is the present practice. The insulating jacket preventing the flask from heating produces accurate reproduction through unidirectional polymerization even though the technique is very similar to that of the present practice, namely immersing the investment in a liquid bath.

While for clarity of explanation, certain embodiments of this invention have been shown and described, it is to be understood that this invention is capable of many modifications, and changes in the construction or parts may be made therein. Certain parts may be employed without the conjoint use of other parts and without departing from the spirit and scope of this invention.

We claim:

1. The method of controlling the polymerization of a rubbery-dough monomer-polymer resin mixture when molding a prosthesis in a flask, comprising forming one side of the mold cavity to simulate the tissue bearing surface of the prosthesis on a cast of dense material, forming the other side of the mold cavity with an investment simulating the other surface of the prosthesis, filling the mold cavity with the monomer-polymer resin mixture, closing the flask, and while the flask remains closed applying heat to the monomer-polymer resin mixture only through the cast to initially polymerize that portion of the monomer-polymer resin mixture which lies against the cast and becomes the tissue bearing surface of the prosthesis.

2. The method of claim 1 which also includes applying pressure to the monomer-polymer resin mixture while the heating subsists.

3. The method of claim 1 characterized in that the application of heat to the cast is channeled only through the cast without applying heat to the flask.

4. The method of claim 1 which also includes continuing the application of heat only through the cast to permit the polymerization to continue unidirectionally through the rubbery-dough monomer-polymer resin mixture in the direction away from the cast and complete polymerization of the prosthesis.

5. The method of claim 4 which also includes cooling the polymerized prosthesis by unidirectionally withdrawing heat therefrom.

6. The method of claim 5 which also characterized in that the unidirectional heating and cooling is in the same direction.

7. The method of claim 5 which also includes forming a portion of the investment in the cope producing the mold cavity with a dense material.

8. The method of controlling the polymerization of a rubbery-dough monomer-polymer resin mixture to form a prosthesis in a flask, comprising forming a cast of dense material having a base on one side and the opposite side simulating the tissue bearing surface of the prosthesis to be formed, placing the base side of a cast on a heat conducting member, placing both the cast and the heat conducting member in a drag of a flask having an opening with the heat conducting member exposed through the opening, placing an investment material between the walls of the drag and the cast and the heat conducting member, forming in the cope of the flask one side of a mold cavity by an investment of a material and using that surface on the cast simulating the tissue bearing surface as the other side of the mold cavity, filling the mold cavity with the monomer-polymer resin mixture, closing the flask, and applying heat to the heat conducting member to heat the cast and initially polymerize the tissue bearing surface of the prosthesis and to thereafter complete the polymerization of the prosthesis being formed and thereby suppress the temperature of exothermic reaction.

9. The method of controlling the polymerization of a rubbery-dough monomer-polymer resin mixture to form a prosthesis in a flask comprising the placing of a cast of dense material in heat conducting contact on a headed heat conducting plug the other end of which extends through the opening in the floor of a drag and beyond the bottom of the drag, placing the drag on a surface that raises the plug head above the drag floor, placing an investment material between the walls and floor of the drag and the plug head and cast thereon to fix the latter in the drag, forming in the cope of the flask a mold cavity simulating a prosthesis by an investment of a material and using the exposed surface of the cast as the other side of the mold cavity, filling the mold cavity with the monomer-polymer resin mixture, closing the flask, and heating the plug to initially polymerize the tissue bearing surface of the prosthesis and to thereafter complete the polymerization of the prosthesis being formed and thereby suppress the temperature of exothermic reaction.

10. A molding flask comprising a drag having an opening therein, a heat conducting plug in said drag and having a portion exposed through said opening to conduct heat to the interior of said drag, a cast of dense material in said drag and in heat conducting engagement with said plug, the upper surface of said cast simulating the tissue bearing surface of a prosthesis, an investment material between the cast and plug and the drag, a cope to close said drag, and an investment material in said cope and forming a cavity with the surface of the cast simulating the tissue bearing surface of the prosthesis.

11. A molding flask comprising a drag having a floor with an opening therein, a heat conducting plug extending through said opening into said drag and in spaced relation with the walls of said drag, a cast mounting surface on the inner end of said heat conducting plug above the floor of said drag, and a cope fitting on and closing over said drag and heat conducting plug, the outer end of said heat conducting plug extending beyond the surface of the flask.

12. The structure of claim 11 which also includes a heater means in said heat conducting plug.

13. A molding flask comprising a drag having a floor with an opening therein, a heat conducting plug extending through said opening into said drag and in spaced relation with the walls of said drag, a cast mounting surface on the inner end of said heat conducting plug above the floor of said drag, a cope fitting on and closing over said drag and the heat conducting plug, the outer end of said heat conducting plug extending beyond the surface of the flask, a clamp means to engage the cope and the drag to close the same, and heater means to engage the extending portion of said plug.

14. A molding flask for making a prosthesis comprising a drag having a cast engaging surface means on the inside thereof, a cast of dense material having one surface simulating a portion of a prosthesis and having another surface in heat conducting engagement with said cast engaging surface means in said drag, a cope to close over said drag and cast, insulating means lining the walls of said cope and drag that are not in engagement with said cast, an investment material in said cope and shaped to form a cavity with that portion of the cast simulating the prosthesis, said drag having an opening through said cast engaging surface means, said cast engaging surface means includes a plug that is exposed through said opening in said drag.

15. A molding flask for making a prosthesis comprising a drag having an opening therein, a heat conducting plug exposed through the opening in said drag, a cast of dense material having one surface simulating a portion of a prosthesis and having another surface in heat conducting engagement with said plug, a cope to close over said drag and cast, and an investment material in said cope and shaped to form a cavity with that portion of the cast simulating the prosthesis.

16. The structure of claim 15 which also includes an insert in the investment material in said cope, said insert extending from the prosthesis to the cope and of greater heat conductivity than said investment material.

17. The structure of claim 15 which also includes insulating means covering the exterior of said flask.

18. A molding flask comprising a cooperating metal drag and cope, means defining an opening in the bottom of said drag, a metal heat conducting plug in said drag with a portion extending out of said opening beyond the bottom of said drag, said metal drag and said cope and said metal plug completing an enclosure, an investment in said drag and cope forming a cavity simulating the shape of a prosthesis, and insert means in said investment and of greater heat conductivity than said investment extending between the cavity and said enclosure to form the sole channeling means to conduct heat to and from said mold cavity.

References Cited in the file of this patent

UNITED STATES PATENTS

| | | |
|---|---|---|
| 1,933,907 | Hickok | Nov. 7, 1933 |
| 2,136,423 | Fields et al. | Nov. 15, 1938 |
| 2,314,377 | Van Rossem | Mar. 23, 1944 |
| 2,359,152 | Pryor et al. | Sept. 26, 1944 |

FOREIGN PATENTS

| | | |
|---|---|---|
| 876,499 | France | Nov. 6, 1942 |